Patented July 12, 1938

2,123,492

UNITED STATES PATENT OFFICE 2,123,492

PROCESS FOR SEPARATING MERCAPTANS

David Louis Yabroff, Oakland, and John Wilkinson Givens, Berkeley, Calif., assignors to Shell Development Company, San Francisco, Calif., a corporation of Delaware No Drawing. Application September 5, 1936, Serial No. 99,636

8 Claims. (Cl. 196—13)

This invention relates to the removal of mercaptans from their solutions in organic liquids and in particular deals with the sweetening of gasoline distillates by treating same with solid substantially anhydrous cadmium hydroxide in the absence of strongly alkaline-reacting substances such as caustic.

It is known that cadmium hydroxide when suspended in an alkaline medium, such as aqueous sodium hydroxide, ammonia, etc. is capable of effecting sweetening of sour hydrocarbons such as gasoline or kerosene distillates, i. e. by removing mercaptans therefrom to an extent so that the distillates react negatively to the so-called "Doctor" test.

In many instances, however, treatment of organic liquids with alkaline-reacting substances has disadvantages. For instance, such treatments render cracked gasoline distillates less gum- and color-stable, due to the removal of acid-reacting hydroxy aromatic compounds which act as gum inhibitors. Certain solvents for mercaptans, such as lower alcohols, being miscible with alkali hydroxides or ammonia, particularly in the presence of water, cannot be treated therewith, while still other solvents of the type of aldehydes, etc. tend to polymerize in the presence of alkalies. Moreover, emulsion difficulties frequently prevent the application of aqueous alkalies.

On the other hand, in the absence of water-soluble alkaline substances, cadmium hydroxide was heretofore considered incapable of effectively removing mercaptans from their solutions in organic solvents such as liquid hydrocarbons, and therefore the advantages offered by the known treating methods involving the use of cadmium hydroxide over ordinary caustic treatment were relatively small.

We now have discovered that mercaptans can be removed from their solutions, in the absence of strongly alkaline-reacting substances, by treatment with cadmium hydroxide, provided the latter is substantially anhydrous, i. e. contains less than about 30% free moisture and preferably less than about 10%. The term "strongly alkaline-reacting substance" as herein used refers to strong bases such as alkali hydroxides, the alkaline earth oxides and hydroxides, ammonium hydroxide, quaternary ammonium bases, etc., any one of which when in aqueous solution is capable of extracting hydroxy aromatic compounds of the type of phenol, xylenol, etc. from their organic solutions. The reason for the difference in behavior between aqueous and anhydrous cadmium hydroxide is believed to be due to the fact, that cadmium hydroxide is preferentially wetted by water, so that when it is contacted in the wet state with a treating solution, such as a sour gasoline distillate, little actual contact between the hydroxide and the gasoline distillate takes place, with the result that only a very small amount of cadmium mercaptides forms within a reasonable period of time, usually insufficient to effect a precipitation of mercaptides. The higher the moisture content of the cadmium hydroxide the more slowly does it react with the mercaptans in the organic solution. If the moisture content is about 30 or 40% or higher, the rate of reaction is too slow for practical use.

In the absence of water, however, cadmium hydroxide is readily wetted by gasoline or other organic solvents containing the mercaptans, and cadmium mercaptides can form and precipitate more rapidly.

Anhydrous cadmium hydroxide is a fine white powder which is non-injurious, is easily handled, for instance, by mechanical blowers, and presents none of the difficulties which are characteristic of alkaline substances. Mechanically the greatest difficulty is occasioned by its fineness which at times may retard settling or cause it to run through filters. Such difficulties can be overcome by employing basket centrifuges, filter aids such as kieselguhr, electrical precipitation means, etc.

Our process is normally carried out by adding the required amount of substantially anhydrous cadmium hydroxide to a batch of mercaptan solution and agitating the mixture until the mercaptan content has been reduced to the desired degree. The spent reagent is then allowed to settle and the supernatant solvent is drawn off; or the mixture is simply filtered.

Another method consists of introducing into a suitable treating vessel an amount of cadmium hydroxide to form a filter bed and continuously passing through this bed the mercaptan solution at a sufficiently low rate to effect the desired mercaptan removal. If some of the reagent is carried off in suspension by the stream of liquid, the suspended matter may be settled out in a suitable settling vessel. The flow of mercaptan solution through the bed may be continued until the reagent is spent, i. e. the mercaptan solution is no longer being desulfurized to the desired degree.

A third practical method consists of continuously feeding cadmium hydroxide or a slurry thereof in a suitable organic solvent which is preferably at least partially miscible with the treating solution, into an agitator together with the treating solution, agitating the resulting mixture, and then filtering it.

The treatment is preferably carried out at normal room temperatures although higher or lower temperatures may be employed.

The amount of cadmium hydroxide required can be calculated, if the concentration of the mercaptans in the solution is known. For successful mercaptan removal the molal ratio of cadmium hydroxide to mercaptan should, in general, not be less than 1, part of the materials reacting according to the equation $$RSH + Cd(OH)_2 \rightarrow Cd(OH)SR + H_2O$$

but the main reaction being $$2RSH + Cd(OH)_2 \rightarrow Cd(SR)_2 + H_2O.$$

While most of the lower cadmium mercaptides, i. e. those containing not more than about 10 carbon atoms are substantially insoluble in organic solvents and particularly in liquid hydrocarbons, we have found that higher mercaptides may be soluble therein to a considerable extent. As a general rule, the solubility of the mercaptides increases with the number of carbon atoms and the branching of the carbon chain. The following rough rule between number of carbon atoms in cadmium mercaptides and their solubility in hydrocarbon liquids has been established: mercaptides of mercaptans containing 6 and less carbon atoms are substantially insoluble in organic solvents and thus can be separated substantially completely; to separate mercaptans having 7 to 10 carbon atoms by means of cadmium hydroxide special means may be required as will hereinafter be explained; and mercaptans having more than 10 carbon atoms frequently form mercaptides of solubilities too great for complete separation.

Since solubility of mercaptides increases with the number of carbon atoms, it is desirable that the formation of di-mercaptides be suppressed as much as possible. This can be partly achieved, by treating the mercaptan solution with an amount of cadmium hydroxide which is in excess of the molal proportion of reagent to mercaptan. However, a certain amount of di-mercaptides seems to form regardless of the excess of reagent, so that this precaution alone is insufficient.

Another means for minimizing the number of carbon atoms in the mercaptides is to suppress the formation of di-mercaptides in which both mercaptide radicals have a comparatively high number of carbon molecules. The probability of the formation of high carbon di-mercaptides depends upon the relative concentration of lower and higher mercaptans. By increasing the concentration of lower over higher mercaptides this probability is reduced. Thus by adding to the mercaptan solution containing relatively high mercaptans a correspondingly substantial proportion of low mercaptans such as ethyl, propyl, butyl mercaptans, we can considerably increase the efficacy of our mercaptan separation. The secondary and tertiary low mercaptans seem to be especially useful for this purpose as may be seen from the following example:

Samples of a gasoline containing .0128% mercaptan sulfur of mercaptans having 6 and more carbon atoms were treated with equi-molal quantities of cadmium hydroxide before and after adding lower mercaptans. 100 milliliters of each treated sample were evaporated and ashed to determine the amount of dissolved mercaptides. The results were as follows:

| Mercaptan added | Total mercaptan sulfur in solution | Residual as Cd O mg. per 100 ml. |
|---|---|---|
| None | .0128 | 14.4 |
| Ethyl mercaptan | .0410 | 3.8 |
| Isopropyl mercaptan | .0430 | 1.8 |
| Normal butyl mercaptan | .0503 | 3.8 |
| Secondary butyl mercaptan | .0533 | 2.2 |
| Tertiary butyl mercaptan | .0476 | 0.0 |

Another method of removing soluble cadmium mercaptides from their solutions consists of treating them with non-acid adsorption agents such as charcoal, magnesium hydroxide, etc. The adsorbent may be added together with the cadmium hydroxide, or the cadmium hydroxide treated solution may subsequently be contacted with the adsorbent. Occasionally, in contacting with the adsorbent a small amount of free mercaptans may be re-liberated from the mercaptides. This small quantity may, if desired, be converted to di-sulfides by oxidation to render the solution sweet. Acid-reacting adsorbents, as fuller's earth and other bleaching clays, silica gel, etc. always liberate relatively large amounts of free mercaptans, and therefore should not be applied. The effectiveness of non-acid adsorbents is illustrated in the following example of treating a West Texas straight run gasoline:

| Treating reagent | Mercaptan or mercaptide in treated solution | "Doctor" test |
|---|---|---|
| None | .0818 | Sour. |
| Cd(OH)$_2$ | .0500 | Sweet. |
| Mg(OH)$_2$ | .0600 | Sour. |
| Cd(OH)$_2$+Mg(OH)$_2$ | .0032 | Slightly sour. |

While our treating method is generally applicable to mercaptan solutions in organic substantially non-acid solvents as hydrocarbons, chlorinated hydrocarbons, alcohols, ethers, aldehydes, ketones, nitrohydrocarbons, aminohydrocarbons, alkylcyanides, etc. or various combinations of such solvents, it is of particular value when applied to the sweetening of gasoline distillates. As has been indicated hereinbefore, other treating methods capable of actually removing mercaptans, such as caustic treatment, also remove the acid-reacting natural gum inhibitors, while other sweetening treatments merely convert mercaptans to di-sulfides. It is well known that the removal of mercaptans is preferable to their conversion to di-sulfides, since di-sulfides adversely affect the antiknock value and lead susceptibility of gasolines. On the other hand, the retention of natural gum inhibitors is very desirable as is illustrated by the following example.

Samples of a cracked gasoline fraction boiling from 150° to 200° C. were sweetened with "Doctor" solution, cadmium hydroxide suspended in aqueous alkali hydroxide, and anhydrous cadmium hydroxide, respectively, with the following results:

| Sweetening reagent | Induction period | Copper dish gum mg. per 100 ml. |
|---|---|---|
| None | 4 hr. 35 min | 111 |
| "Doctor" solution | 2 hr. 50 min | 54 |
| Cadmium hydroxide in caustic solution | 3 hr. 20 min | 38 |
| Anhydrous cadmium hydroxide | 6 hr. 10 min | 1 |

The induction period is the time to which the gasoline may be exposed to 100 lbs. oxygen pressure at 100° C. until spontaneous absorption of oxygen begins. The induction period is a measure for the storage stability of the gasoline.

It is known that the natural gum inhibitors in gasoline boil substantially above 150° C. and usually above 175° C. Since the cadmium hydroxide sweetening is relatively expensive, we often fractionally distill a gasoline to be sweetened to produce a lighter fraction boiling below about 175° C. containing mercaptans and usually hydrogen sulfide, but which is substantially free from natural gum inhibitors, and a heavier fraction boiling between about 175° C. and the normal end boiling point of gasolines, which besides containing mercaptans is an inhibitor concentrate free from hydrogen sulfide. The light fraction is sweetened by any convenient method preferably one which is capable of removing mercaptans, for instance, by extraction with aqueous caustic containing less than 50% water or a mixture of aqueous caustic and a suitable solubility promoter for mercaptans such as ethanol amine, ethylene diamine, quaternary ammonium bases, etc. The heavier fraction is treated with anhydrous cadmium hydroxide with or without the addition of a non-acid adsorption agent. After removal of the treating reagents the fraction, if still slightly sour, may be oxidized in any suitable manner to convert last traces of mercaptans to di-sulfides. The fully sweetened heavier fraction, containing the natural gum inhibitors, may then be blended with the sweetened light fraction to produce a balanced, sweet and stabilized gasoline of good lead susceptibility.

Elimination of hydrogen sulfide and carboxylic acids from gasoline distillates prior to treatment with cadmium hydroxide is desirable, preferably by treating in a manner to avoid substantial removal of natural gum inhibitors, for instance, by suitably fractionally distilling and/or treating with non-alkaline or weakly alkaline reagents such as tripotassium phosphate, sodium arsenite, lead oxide, iron oxide, etc. Hydrogen sulfide is preferentially absorbed by cadmium hydroxide, thereby consuming same, and the separation of mercaptans cannot proceed until it has been removed, while carboxylic acids tend to form oil soluble cadmium salts, which would cause the loss of cadmium hydroxide aside from introducing into the gasoline a compound which upon combustion forms an undesirable ash.

Cadmium hydroxide is most easily regenerated from the mercaptides by dissolving the latter in a dilute acid, such as sulfuric, and then precipitating the hydroxide by making the solution slightly alkaline. The precipitated cadmium hydroxide is filtered and dried under conditions substantially to prevent its conversion to the oxide, the latter being ineffective for separation of mercaptans. Suitable drying temperatures are about 100° to 110° C. at normal atmospheric pressures.

We claim as our invention:

1. In the process of separating mercaptans contained in a solution of an organic solvent for mercaptans which is liquid and substantially inert to cadmium hydroxide under the conditions of the treatment, the steps of reacting the dissolved mercaptans at substantially normal room temperature with a solid reagent free from acidic and strongly alkaline reacting substances whose only active component consists of cadmium hydroxide containing less than 30% water, and separating products of reaction from the solvent.

2. In the process of separating mercaptans contained in a solution of an organic solvent for mercaptans which is liquid and substantially inert to cadmium hydroxide under the conditions of the treatment, the steps of suspending in said solution at substantially normal room temperature a solid reagent free from acidic and strongly alkaline reacting substances whose only active component consists of cadmium hydroxide containing less than 30% water, thereby reacting the mercaptans with the cadmium hydroxide, and separating products of reaction from the solvent.

3. In the process of separating mercaptans contained in a solution of a hydrocarbon distillate, the steps of contacting said distillate at substantially normal room temperature with a solid reagent free from acidic and strongly alkaline reacting substances whose only active component consists of cadmium hydroxide containing less than 30% water, thereby reacting the mercaptans with the cadmium hydroxide, and separating products of reaction from the distillate.

4. In the process of separating mercaptans contained in a solution of an organic solvent for mercaptans which is liquid and substantially inert to cadmium hydroxide under the conditions of the treatment, the steps of suspending in said solution at substantially normal room temperature a solid powder consisting of cadmium hydroxide containing less than 10% water, thereby reacting mercaptans with the cadmium hydroxide, and separating products of reaction from the solvent.

5. In the process of separating mercaptans contained in a solution of an organic solvent for mercaptans which is liquid and substantially inert to cadmium hydroxide under the conditions of the treatment, the steps of reacting the dissolved mercaptans at substantially normal room temperature with an amount of a solid reagent free from acidic and strongly alkaline reacting substances whose only active component consists of cadmium hydroxide containing less than 30% water, said amount containing at least one mol. of cadmium hydroxide per mol. mercaptans in the solution, and separating products of reaction from the solvent.

6. In the process of separating mercaptans contained in a solution of an organic solvent for mercaptans which is liquid and substantially inert to cadmium hydroxide under the conditions of the treatment, the steps of suspending in said solution at substantially normal room temperature a solid reagent free from acidic and strongly alkaline reacting substances whose only active component consists of cadmium hydroxide containing less than 30% water, and a separate solid adsorbent comprising magnesium hydroxide, thereby reacting mercaptans with the cadmium hydroxide, and separating products of reaction from the solvent.

7. In the process of separating mercaptans contained in a solution of an organic solvent for mercaptans which is liquid and substantially inert to cadmium hydroxide under the conditions of the treatment, the steps of suspending in said solution at substantially normal room temperature a solid reagent free from acidic and strongly alkaline reacting substances whose only active component consists of cadmium hydroxide containing less than 30% water, and a separate solid adsorbent consisting of magnesium hydroxide, thereby reacting mercaptans with the cadmium hydroxide, and separating products of reaction from the solvent.

8. In the process of separating mercaptans of more than 6 carbon atoms contained in a solution of an organic solvent for mercaptans which is liquid and substantially inert to cadmium hydroxide under the conditions of the treatment, the steps of dissolving in said solution mercaptans of less than 5 carbon atoms and contacting the resulting mercaptan enriched solution at substantially normal room temperature with a solid reagent free from acidic and strongly alkaline reacting substances whose only active component consists of cadmium hydroxide containing less than 30% water, thereby reacting mercaptans with the cadmium hydroxide, and separating products of reaction from the solvent.

DAVID LOUIS YABROFF.
JOHN WILKINSON GIVENS.